(12) United States Patent
Alvarado

(10) Patent No.: US 9,099,058 B2
(45) Date of Patent: Aug. 4, 2015

(54) METHOD FOR BROWSING WITHIN A CONTENT DISPLAYABLE BY BROWSING COMMANDS, BROWSING DEVICE AND ASSOCIATED PROGRAM

(71) Applicant: France Telecom, Paris (FR)

(72) Inventor: Cuihtlauac Alvarado, Lannion (FR)

(73) Assignee: France Telecom, Paris (FR)

( * ) Notice: Subject to any disclaimer, the term of this patent is extended or adjusted under 35 U.S.C. 154(b) by 333 days.

(21) Appl. No.: 13/781,116

(22) Filed: Feb. 28, 2013

(65) Prior Publication Data

US 2013/0226592 A1    Aug. 29, 2013

(30) Foreign Application Priority Data

Feb. 29, 2012  (FR) ...................................... 12 51820

(51) Int. Cl.
| | | |
|---|---|---|
| G06F 3/041 | (2006.01) | |
| G09G 5/38 | (2006.01) | |
| G06F 3/0485 | (2013.01) | |
| G06F 3/0488 | (2013.01) | |

(52) U.S. Cl.
CPC .............. G09G 5/38 (2013.01); G06F 3/0485 (2013.01); G06F 3/04883 (2013.01)

(58) Field of Classification Search
None
See application file for complete search history.

(56) References Cited

U.S. PATENT DOCUMENTS

| | | | |
|---|---|---|---|
| 7,750,893 B2 * | 7/2010 | Hashimoto et al. ........... | 345/173 |
| 7,844,915 B2 * | 11/2010 | Platzer et al. ................. | 715/781 |
| 8,209,606 B2 * | 6/2012 | Ording ......................... | 715/700 |
| 8,522,308 B2 * | 8/2013 | Stinson, III ....................... | 726/2 |
| 8,760,418 B2 * | 6/2014 | Miyazawa et al. ............ | 345/173 |
| 8,850,560 B2 * | 9/2014 | Kim et al. ....................... | 726/19 |
| 2007/0067328 A1 | 3/2007 | Mingot et al. | |
| 2007/0132789 A1 * | 6/2007 | Ording et al. ................. | 345/684 |
| 2011/0090255 A1 | 4/2011 | Wilson et al. | |
| 2011/0107264 A1 | 5/2011 | Akella | |
| 2011/0161892 A1 | 6/2011 | Hamadene | |
| 2012/0026181 A1 | 2/2012 | Wagner et al. | |
| 2012/0060109 A1 * | 3/2012 | Han et al. ...................... | 715/769 |
| 2013/0222312 A1 * | 8/2013 | Wilson et al. ................. | 345/173 |
| 2013/0339869 A1 * | 12/2013 | Stinson, III ................... | 715/741 |
| 2014/0340334 A1 * | 11/2014 | Cho .............................. | 345/173 |

FOREIGN PATENT DOCUMENTS

WO    2004105392 A1    12/2004

OTHER PUBLICATIONS

French Search Report and Written Opinion dated Nov. 1, 2012 for corresponding French Application No. 1251820, filed Feb. 29, 2012.

* cited by examiner

*Primary Examiner* — Satwant Singh
(74) *Attorney, Agent, or Firm* — David D. Brush; Westman, Champlin & Koehler, P.A.

(57) ABSTRACT

A method for browsing in a visual content such as a document or a list. The content is available on a terminal having a browsing command. Part of the content is displayed on a display of the terminal. The browsing commands enable the contents displayed on the screen to be made to scroll in the direction specified by the command introduced. The displayed part is duplicated into two identical images when one end of the content situated in the direction of movement specified by the browsing command is displayed on the means for displaying. A first image remains still and a second image moves in the direction of movement specified by the browsing command so long as the command is active. In this way, the user sees that the command has indeed been taken into account and notes visually that the end of the visual content has been reached.

11 Claims, 4 Drawing Sheets

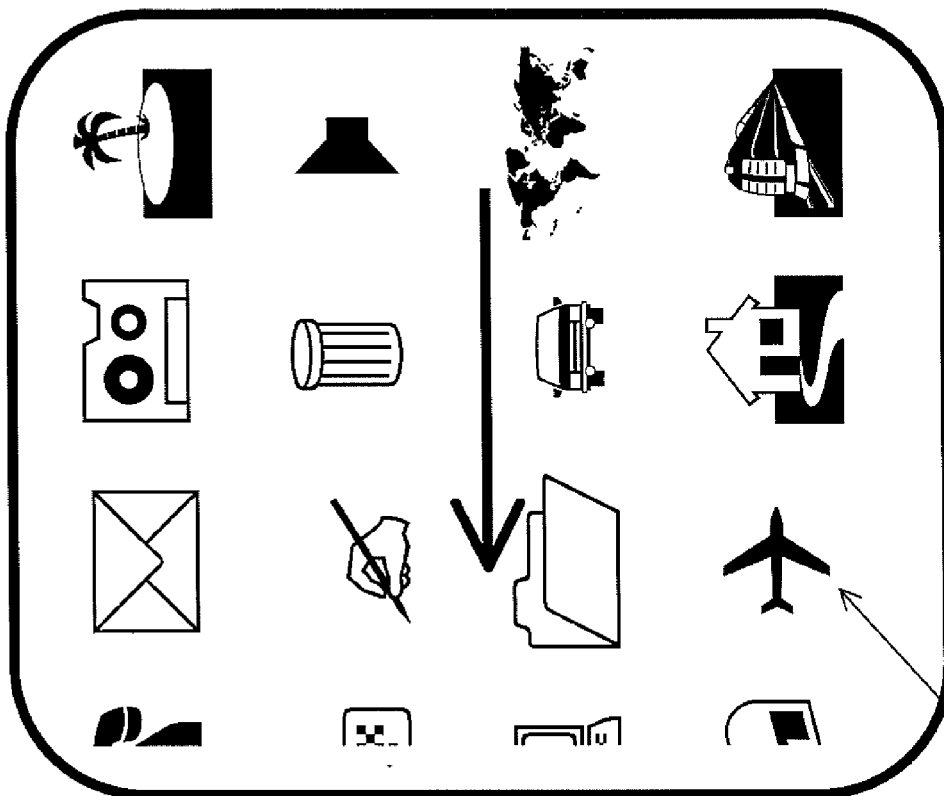
Fig. 2.B
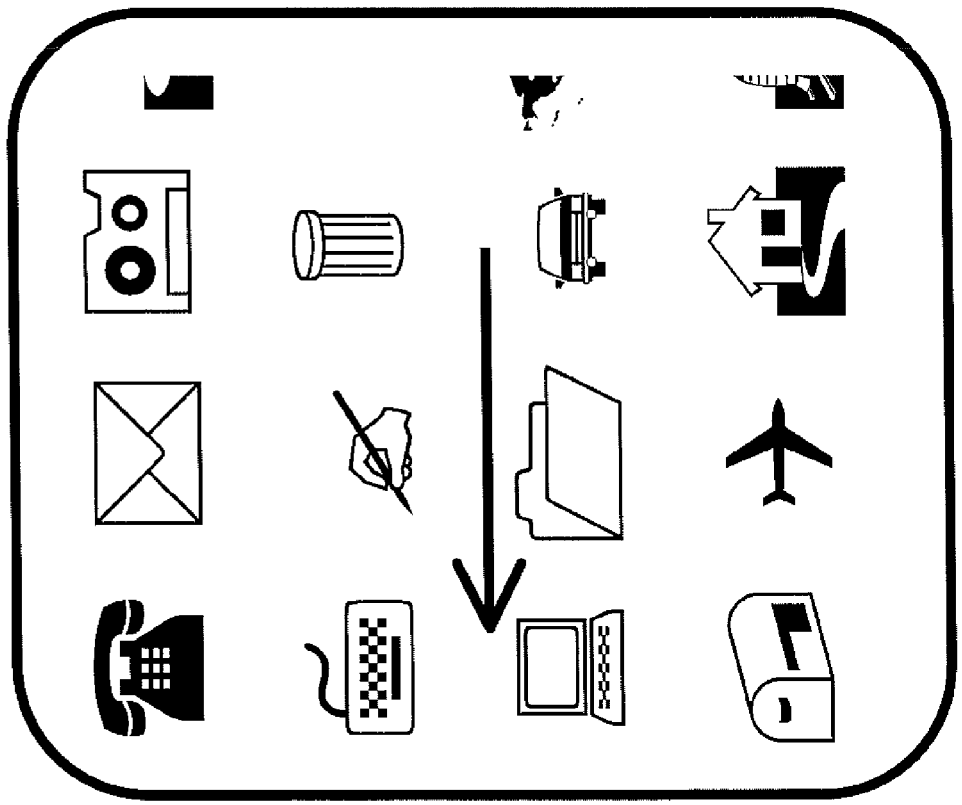
Fig. 2.A

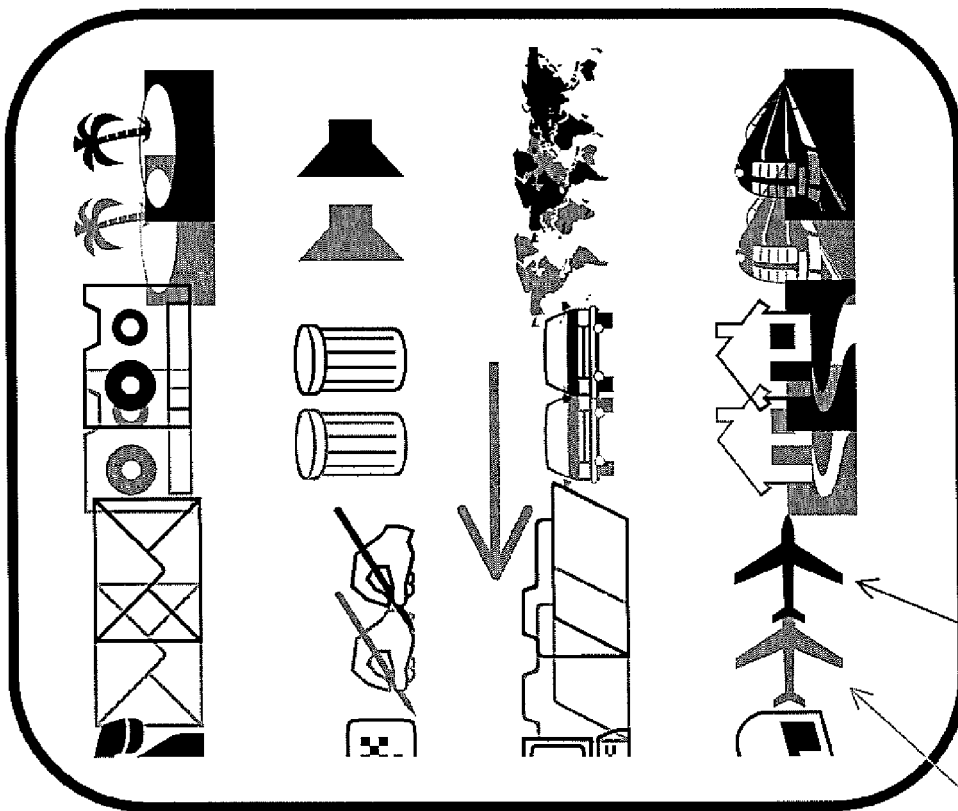
Fig. 2.D
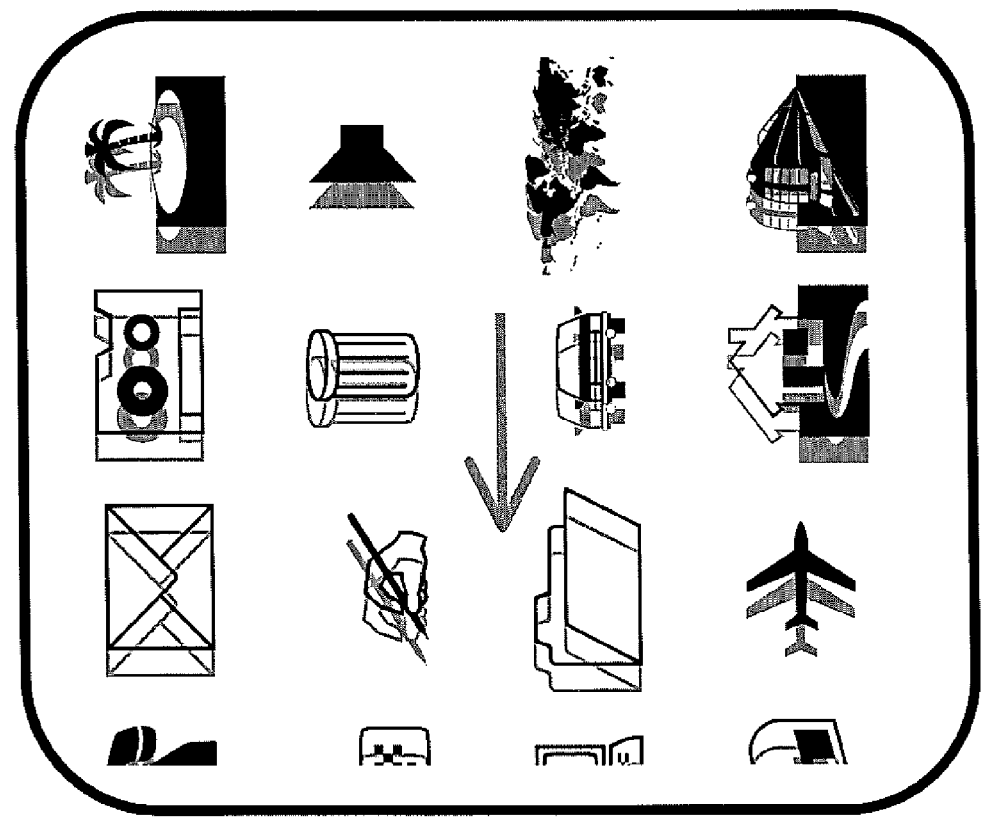
Fig. 2.C

METHOD FOR BROWSING WITHIN A CONTENT DISPLAYABLE BY BROWSING COMMANDS, BROWSING DEVICE AND ASSOCIATED PROGRAM

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure pertains to a method for browsing within a displayable content. A part of the content is displayed and browsing commands are used to move the viewing window visible on the screen. The present disclosure makes it possible to alert the user to the fact that the end of the displayable content has been reached.

BACKGROUND OF THE DISCLOSURE

Many apparatuses presently have display devices and means for introducing commands such as a keyboard, a mouse or a voice recognition tool. With these means, the user can introduce commands and see the requested information on a viewing screen. Touch screens can be used at the same time to display the information, present control icons and detect the selection of an icon to activate the associated command. Such screens enable intensive interaction with the user and an almost infinite number of commands since they depend only on the capacity of the apparatus to generate menus.

The classic commands that a user can introduce into a display device include browsing commands. These commands come into play when the user launches a search for elements coming from a network or a memory of his apparatus. The elements are then presented on the screen in the form of a list of identifiers in which the user can browse. If an element of the list interests the user, he can select it and start acting on the associated element. For example, if the user asks to see all the applications available on his mobile telephone, then he launches the display of a list of icons associated with the applications available. The user browses in the list displayed by moving a focus. When the focus is positioned on the desired icon, the user introduces a selection command to activate the execution of the application associated with this icon.

Other identifiers can be used to identify a selectable element, for example a string of characters representing the title of a song, a photograph identifying a work of art, a video sequence identifying a film, etc. If the number of identifiers is great, then it is not possible to display all the identifiers of the list. Thus, the apparatus displays a fragment of the list and offers the user browsing commands enabling the viewing window to be moved within the list.

When the user activates a browsing command, i.e. a command aimed at moving the viewing window, he expects a change in the content displayed on his screen. The identifiers are generally laid out in a 2D matrix, and the viewing window moves according to the following four directions commands: Up, Down, Left and Right. The browsing commands can be likened to commands for moving the viewing window in a given direction.

A problem arises when there is no longer any identifier to be displayed in the direction specified by the command. If the browsing command continues to act on the display, then the viewing window showing the identifiers moves beyond the end of the document or the last element present in this direction and the screen becomes empty of content, and the user cannot determine the direction by which he can return to the identifiers on the screen. Furthermore, if the screen is empty, the user may believe that his apparatus is out of service since the activation of the command produces no visual effect. In such circumstances, it would be desirable to inform the user that the activation of a browsing command does indeed produce an effect and that, since the edge of the displayable content has been reached, the activation of new commands in this direction will not show a new content on the screen.

The patent application WO 2004/105392 describes a browsing within an ordered list of elements, in displaying sub-lists. An element is in the focus and browsing commands enable it to be moved. To situate this element within the displayed sub-list, the current element is surrounded by two elements of the list. This presentation is no longer possible when the element is the last (or the first) in the list. In this case, the menu as described in FIGS. 9, 10 and 11 of this request displays a sub-list with the element in the focus preceded or followed by an empty location. This empty location is the differentiating sign that an end of the list has been reached. But this prior-art document shows an absence of mobility of the display when the end of the list is reached. The user therefore cannot determine whether his apparatus is out of service or whether he has reached a browsing limit.

An exemplary embodiment of the present disclosure provides another way to alert a user to the fact that the end of the list of the elements in the current browsing direction has been reached.

SUMMARY

According to a functional aspect, an exemplary embodiment of the present disclosure pertains to a method for browsing within a visual content compliant with the introductory paragraph. The method includes a step for duplicating said displayed part into two identical images when one end of the visual content situated in the direction of movement specified by the browsing command is displayed on a screen. A first image remains still and a second image moves in the direction of movement specified by the browsing command so long as this command is active.

In this way, the user notes that his browsing command has been really taken into account by his apparatus and in seeing the duplication of the image at a certain point in time, he knows that the end of the visual content in this browsing direction has been reached.

According to one particular embodiment, the means for displaying is a touch screen and the activation of the browsing command consists in moving an object on said screen. Furthermore, the movement of the second image of the viewing window is controlled by the movement of the object on the screen. In this way, the user directly controls the movement of the viewing window and, in the face of the new movement of the browsing window, he immediately perceives that the end of the visual content has been reached.

According to another embodiment, the browsing command is characterized by an active state and an idle state and the amplitude of the movement of the second image of the viewing window depends on the time during which the command is active. In this way, the user controls the movement of the browsing window by means of simple browsing commands.

According to another embodiment, the speed of movement of the second image of the viewing window is variable during the time in which the command is active. In this way, the second image which goes beyond the end of the displayed menu moves decreasingly during its exit from the screen.

According to one example of an embodiment, the introduction of the browsing command is done by a keyboard comprising browsing keys, these keys specifying a direction of movement. In this way, the user controls the movement of the browsing window through simple browsing keys. In one embodiment, the introduction of the browsing command is done by voice recognition. In this way, the user controls the movement of the browsing window simply with his voice.

According to one example of an embodiment, the browsing comprises a step for returning to a displayed content with a single image, this step being launched when the browsing command is no longer active. In this way, the user sees an automatic return to a displayed content corresponding to the point in time in the browsing when the end of the visual content is reached. According to one example of an embodiment, the speed of movement of the second image varies during the return step. In this way, the movement of the second image is optimized. According to one example of an embodiment, the duration of movement of the second image during the return step is smaller than the duration of movement of the second image when the browsing command is activated. In this way, this step of returning to an initial browsing menu is faster.

According to another hardware aspect, an exemplary embodiment pertains to an electronic apparatus comprising a means for displaying a visual content and a means for introducing browsing commands, said browsing commands enabling the selection of a part of the content in order to display it on the means for displaying. The apparatus comprises a means for duplicating said displayed part into two identical images when one end of said content situated in the direction of movement specified by the browsing command is displayed on the means for displaying. A first image remains still and a second image moves in the direction of movement specified by the browsing command so long as said command is active.

According to another hardware aspect, an exemplary embodiment pertains to a computer program characterized in that it comprises program code instructions for implementing a step for duplicating a content displayed during the browsing in a visual content into two identical images as described further above when this program is executed by a processor.

BRIEF DESCRIPTION OF THE DRAWINGS

Other characteristics and advantages shall appear more clearly from the following description of a particular embodiment given by way of a simple illustrative and non-exhaustive example, and from the appended figures, of which.

DETAILED DESCRIPTION OF ILLUSTRATIVE EMBODIMENTS

A description is provided first of all of the structure of a multimedia apparatus 1 provided with a display device 2 according to an example of an embodiment of the present disclosure. A smartphone is described here, but other apparatuses can also be used for embodiments of the present disclosure, for example a personal computer or a PVR or any apparatus capable of accessing displayable contents and having available means for creating and displaying browsing menus.

Figure 1:
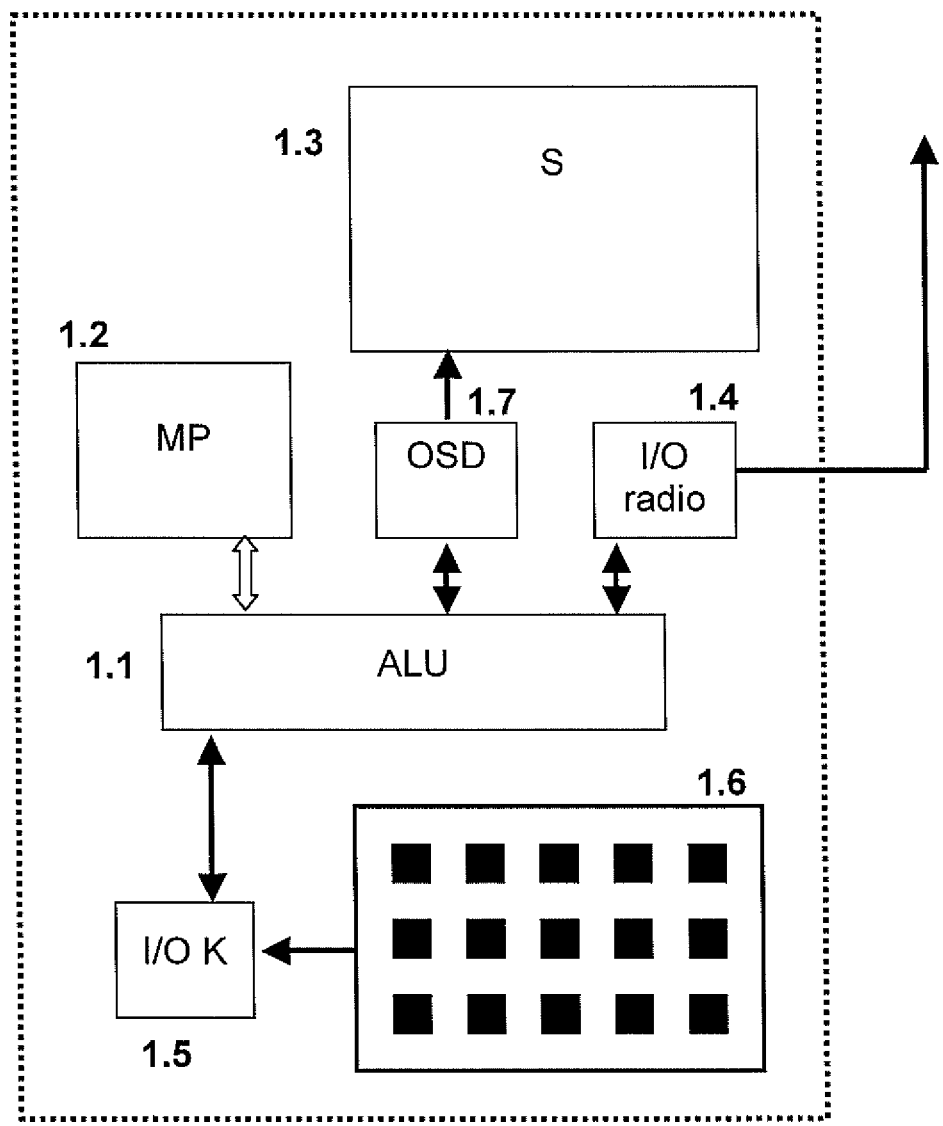
FIG. 1 presents the main elements of an apparatus enabling the implementation of the invention according to one particular example of an embodiment, FIGS. 2.A to 2.D present appearances of screens generated during the browsing according to one example of an embodiment.

FIG. 1 presents the main elements of a smartphone according to one embodiment. The smartphone 1 has a central processing unit ALU 1.1 connected to an executable program memory MP 1.2, a screen S 1.3, a radio communications module 1.4, and an interface module 1.5 with a keyboard 1.6. The communications module enables communication in the range of radio frequencies compatible with wireless communications networks such as: 2G/GSM (Global System Mobility technology) or 3G/UMTS (Universal Mobile Telephone System technology), or 4G/LTE (Long Term Evolution technology). According to a preferred embodiment, the screen 1.3 is a touch screen type of screen, and consequently the keyboard 1.6 is integrated into the screen for that reason. According to one variant, the keyboard is distinct from the screen and has at least four browsing keys on which the associated printed symbols are arrows oriented in at least two opposite directions such as left and right. In the case of a touch screen, the activation of a browsing direction command is done by sliding the finger or any object such as a stylus in the desired direction. In this way, the user can indicate a large number of different browsing directions.

The smartphone also has a circuit 1.7 for displaying data on the screen, often called an OSD (on-screen display) circuit. The OSD circuit 1.7 is a text and graphics generator which enables the display, on the menu screen, of pictograms (for example a number corresponding to the channel viewed) and enables the display of the browsing means according to the present disclosure. The OSD circuit 1.7 is controlled by the central processing unit 1.1 and can be interposed between this central processing unit and the screen 1.3.

The program memory contains resident executable programs and, as the case may be, a read/write type part for the recording and execution of downloaded programs. These downloaded programs are typically applications dedicated to a determined use such as messaging, searching for information on the Internet, downloading audio and/or visual documents, teleshopping, etc. The program memory MP contains a browsing module which shall here below be called the "Browser". This module is responsible for presenting documents or lists of elements on the screen and managing the activation of the browsing commands enabling the content displayed on the screen to be changed. The browsing commands typically make the content displayed on the screen scroll in the direction specified by the command introduced. The Browser is advantageously made in the form of a program module recorded in the memory MP. It can also be made in the form of a specialized circuit of the ASIC type for example.

After having described the different elements of an exemplary embodiment in detail, we shall now explain the way in which these elements cooperate.

Initially, the user launches his Browser on his multimedia apparatus. He then specifies the type of visual contents on which he wishes to browse. The term "browsing" is understood to mean the display of identifiers of elements such as documents or parts of a document and the introduction of commands to modify the content of the viewing window. The Browser can for example display a list of file identifiers or a list of services accessible from a portable device or again the content of a photo album, etc. In the context of an embodiment of the present disclosure, the browsing content comprises a plurality of graphic identifiers laid out along at least one browsing line. Two commands at least are available so as to specify the direction of movement in one direction and in the opposite direction along said line. An embodiment of the present disclosure makes it possible to inform the user that he has reached the last element placed on the browsing line in the direction specified by the currently activated command.

The FIGS. 2.A to 2.F present the appearances of screens generated during the browsing in a first example of an embodiment. This screen 1.3 is that of a smartphone type. It is a touch screen type of screen and has a size of 4 cm wide by 6.5 cm high approximately. The activation of the browsing and selection commands is done by placing the finger or any object such as a stylus on the screen 1.3. The browsing menu has 16 icons giving access to an equivalent number of applications. The 16 icons are laid out in four columns of four icons each. Given its size, the screen 1.3 can display only 12 icons entirely in the viewing window.

FIG. 2.A presents the screen 1.3 with a viewing window displaying the 12 left-hand icons entirely. A part of the column of the four icons can be seen to the right. The user's finger (or stylus) which is at the centre of the screen then moves by a few millimeters leftwards. FIG. 2.B shows a new viewing window where the 12 icons on the right are displayed entirely. The user then continues to move his finger or his stylus by a few millimeters leftwards as shown by the arrow at the centre of the figure. The Browser detects the fact that the end of the browsing menu situated in the direction of movement specified by the browsing command has been reached and consequently the command introduced cannot make other icons appear. The Browser informs the user of this state. FIG. 2.0 then presents a new viewing window where the image of the viewing window is duplicated into two images by the OSD circuit under the Browser's control, a first image (black in the figure) remains still relative to FIG. 2.B and a second image (grey in the figure) is slightly offset leftwards in the direction indicated by the finger or stylus. Let us assume that the finger then continues to move leftwards, as can be seen by the arrow at the centre of FIG. 2.C. FIG. 2.D then presents a displayed content comprising two identical images I1 and I2, one being distinctly offset relative to the other. For reasons of readability, at least one of the images is transparent so that the other can be seen. According to one embodiment, the moving image I2 appears as being attenuated relative to the other image I1 which is still. The image I1 presents the 12 right-hand icons in their entirety, and the image I2 presents the browsing menu offset leftwards with the icons of the left-hand column being half visible. This representation with two identical and offset images shows the user that the first image I1 is blocked on the screen and that the browsing in this direction has no longer any effect because the end of the browsing menu has been reached and that the second image I2 is still associated with the upward browsing, thus showing that the browser is still operational.

According to a preferred embodiment, the movement of the second image I2 of the viewing window is identical to the movement of the finger or the stylus applied to the screen 1.3. In this way, the user sees that the movement of his finger or of a stylus activates a modification of the display relative to the command introduced and deduces from this that his apparatus 1 remains operational.

Figure 3:
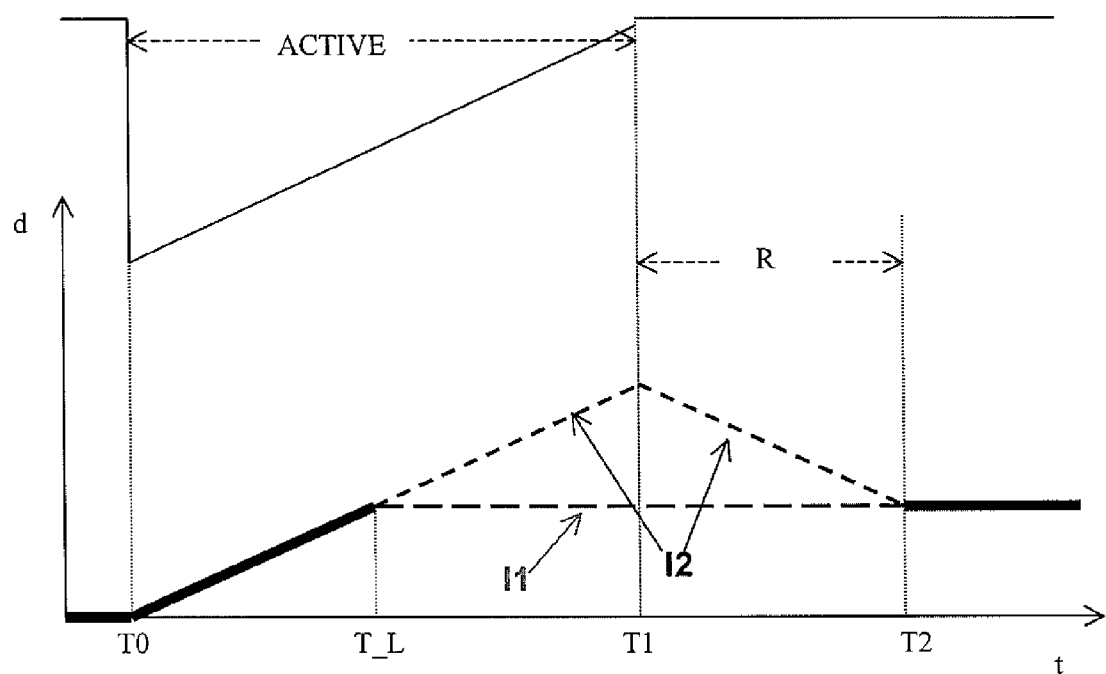
FIG. 3 shows the movement of the images of the browsing window displayed on the touch screen according to one embodiment.

FIG. 3 illustrates this mode of operation. The curve presented shows the movement "d" of the images I1 and I2 and the movement of the object on the screen as a function of the time "t". During the movement of the object on the screen presented at the top of the figure, the command is considered to be "ACTIVE". The movement starts at the instant T0 and ends at the instant T1. The movement of the object on the screen controls the movement of the image in the visual window, the object and the displayed image moving with the same amplitude and the same direction until, at the point in time T_L, the end of the browsing menu is reached in the direction of movement specified by the object. At this time T_L, the image is duplicated: one image I1 remains still and the other image I2 continues to move as a function of the position of the object on the screen. At the instant T1, the screen presents for example the appearance illustrated in FIG. 2.D, and the image I2 stops moving in the direction specified by the command. According to one particular embodiment, the image I2 goes backwards for a duration R and gets positioned at the same place as the image I1. At the end of the duration R, at the instant denoted as T2, the two images get superimposed perfectly and merge so as to form only one image. This backward movement of the second image I2 makes the user understand that a part of his last command has been erased because the end of the browsing menu has been reached.

According to another embodiment, the means for introducing commands are characterized by an activated state and an idle state. Such commands are for example browsing keys, typically marked by arrows indicating direction. In this mode, the duration of pressure on the keys defines the movement of the display window in the direction specified by the key. As soon as the user releases the key, the display window stops moving within the browsing menu. Commands characterized by two states also consist in the display of icons on the screen 1.3. These icons, representing browsing commands of the "left", "right", "up", "down" type, can be selected or not selected. Such commands can also be obtained by a voice recognition engine making it possible to interpret voice expressions such as "left", "right", "up", "down". The voice recognition engine transcribes the sound signals into browsing commands. The end of the introduction of a command takes place when the user utters the word "stop".

Figure 4:
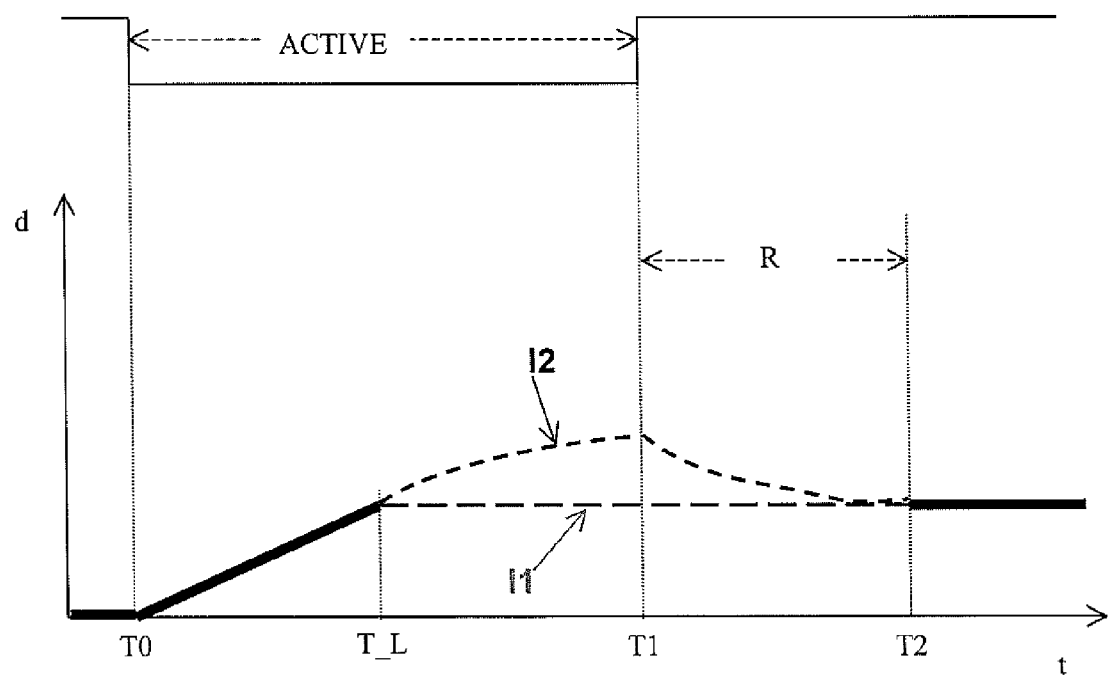
FIG. 4 shows a movement of the images of the browsing window during the activation of a command according to another example of an embodiment.

In this embodiment, the amplitude of the movement depends on the duration of activation of the command. According to one simple embodiment, the amplitude of movement is proportional to the duration. According to another embodiment, the amplitude of the movement varies as a function of the duration of activation of the command according to a logarithmic function. FIG. 4 illustrates this other mode.

The top part of FIG. 4 shows the duration in which a direction key is pressed, a browsing icon is selected or again a voice command is activated. The movement of the display window starts at the instant T0 when the user activates the command. At the instant T_L, the end of the browsing menu is reached in the direction specified by the command. At this instant T_L, the image gets duplicated: one image I1 remains still and the other image I2 continues to move in the direction specified by the command. The speed of movement of the image I2 varies decreasingly for the duration between the instants T_L and T1 according to a logarithmic variation. In this way, the image I2 disappears in the direction of movement only after a very long time of activation and command, and this situation generally does not take place.

At the instant T1, the user releases the command and according to one particular embodiment, the image I2 goes backwards for a duration R to get positioned at the instant T2 and the same place as the image I1. Just as above, the speed of movement of the return to the image at the same position as at the instant T_L varies logarithmically as a function of time.

In either of the two embodiments illustrated by FIGS. 3 and 4, the duration of return of the image I2 (i.e. the duration between T1 and T2) and the duration between T_L and T1 have a same value. According to one variant, the duration between T1 and T2 is a fraction of the duration between T_L and T1 so that the user does not wait for too long for the return of the browsing menu with a single image. Experience shows that for a screen with a width of 4 cm and a height of 6.5 cm, a ratio of 3 is optimal. For example, for a duration of 1 second between T_L and T1, the duration between T_L and T1 is ⅓ of a second.

The present disclosure is not limited to the embodiments that have just been described. In particular, exemplary embodiment of the present disclosure can be updated by any multimedia apparatus having available a user interface and a display. The displayable contents reproduced by the apparatus can be of a text, photo or graphic type.

An exemplary embodiment of the present disclosure presents a more user-friendly and intuitive way of informing the user that the end of the list of elements in the current browsing direction has been reached and that it is therefore unnecessary to continue to activate browsing commands in this direction.

Although the present disclosure has been described with reference to one or more examples, workers skilled in the art will recognize that changes may be made in form and detail without departing from the scope of the disclosure and/or the appended claims.

The invention claimed is:

1. A method comprising:
    browsing in a visual content, the content being available at a terminal;
    activating a browsing command by the terminal, enabling selection of a part of the content in order to display it on a display of the terminal;
    duplicating said displayed part into two identical images on the display when one end of said content situated in a direction of movement specified by the browsing command is displayed on the display, a first image remaining still and a second image moving in the direction of movement specified by the browsing command so long as said command is active.

2. The method according to claim 1, wherein the display comprises a touch screen and activating the browsing command comprises moving an object on said screen, and wherein the movement of the second image of a viewing window of the display is controlled by the movement of the object on the screen.

3. The method according to claim 1, wherein the browsing command has an active state and an idle state, wherein an amplitude of the movement of the second image of the viewing window depends on the time during which the command is active.

4. The method according to claim 3, wherein a speed of movement of the second image of the viewing window is variable during the time in which the command is active.

5. The method according to claim 3, wherein activating the browsing command is performed through a keyboard comprising browsing keys, these keys specifying a direction of movement.

6. The method according to claim 3, wherein activating the browsing command is performed with the terminal by voice recognition.

7. The method according to claim 1, wherein the method comprises a step of returning to a displayed content with a single image, said step of returning being activated when the browsing command is no longer active.

8. The method according to claim 7, wherein a speed of movement of the second image varies during the step of returning.

9. The method according to claim 7 wherein a duration of movement of the second image during the step of returning is smaller than a duration of movement of the second image when the browsing command is active.

10. An electronic apparatus comprising:
    display configured to display a visual content;
    means for introducing a browsing command, said browsing command enabling selection of a part of the content in order to display it on the display;
    means for duplicating said displayed part into two identical images on the display when one end of said content situated in a direction of movement specified by the browsing command is displayed on the display, a first image remaining still, and a second image moving in the direction of movement specified by the browsing command so long as said browsing command is active.

11. A non-transitory computer-readable memory comprising a computer program stored thereon and comprising program code instructions for implementing a method for duplicating a content displayed when this program is executed by a processor, wherein the instructions comprise:
    instructions configured to enable browsing in the visual content, the content being available at a terminal;
    instructions configured to select of a part of the content in order to display it on a display of the terminal in response to activation of a browsing command on the terminal; and
    instructions configured to duplicate said displayed part into two identical images on the display when one end of said content situated in a direction of movement specified by the browsing command is displayed on the display, a first image remaining still and a second image moving in the direction of movement specified by the browsing command so long as said command is active.

* * * * *